Aug. 16, 1927.

P. NEU

CRUST BREAKER

Filed Nov. 15, 1926

1,639,307

Peter Neu
Inventor,

By C. A. Snow & Co.
Attorneys.

Patented Aug. 16, 1927.

1,639,307

UNITED STATES PATENT OFFICE.

PETER NEU, OF BAYARD, NEBRASKA.

CRUST BREAKER.

Application filed November 15, 1926. Serial No. 148,452.

This invention has reference to a device designed for use in connection with disk cultivators, and aims to provide novel means operating between adjacent disks of a cultivator for breaking the ground surface or crust between the disks, during the harrowing operation.

An important object of the invention is to provide means for regulating the pressure on the device, thereby adapting it for use in breaking the ground surface when the ground surface has become exceptionally hard.

A still further object of the invention is the provision of means to adjust the device with respect to the cultivator frame, so that the pressure directed to the crust breaker, may be regulated with a degree of accuracy, and the device may be used in connection with cultivators of various types.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
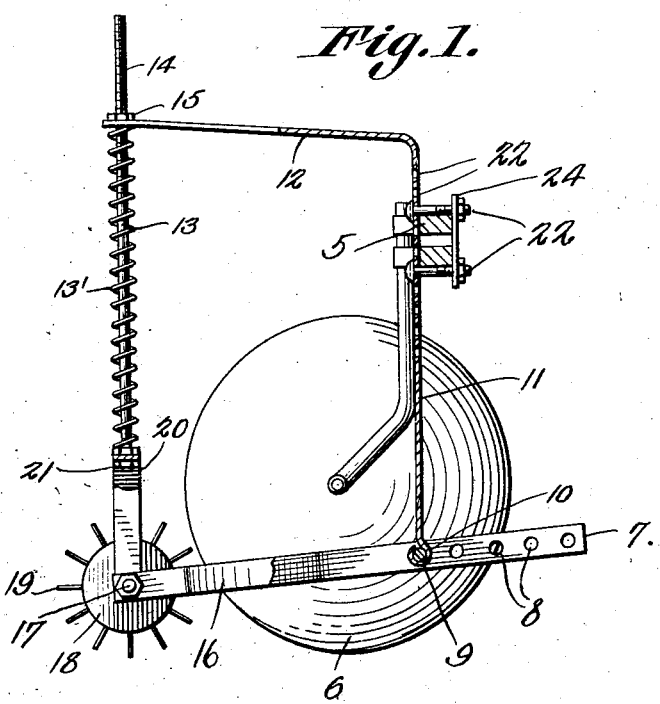
Figure 1 is a longitudinal sectional view through the device showing the same as supported on a cultivator frame.

Referring to the drawing in detail, the reference character 5 designates cultivator beams to which the disks 6 are secured in the usual and well known manner.

The device forming the essence of the present invention is designed for use in connection with a cultivator and more particularly with a cultivator of a disk type, the same being shown as positioned in such a way that it contacts with the ground surface between the disks to crush or break the same.

The device includes a pair of arms 7 that are provided with a plurality of openings 8 to receive the bolt 9, which bolt also passes through the eye 10 formed at the lower end of the bar 11, the eye 10 being shown as positioned between the arms 7.

This bar 11 has a rearwardly extended end portion 12 provided with an opening through which the rod 13 passes, the rod 13 being provided with a threaded portion 14 to accommodate the nut 15, so that the rod 13 may be moved through the opening for purposes to be hereinafter more fully described.

Figure 2:
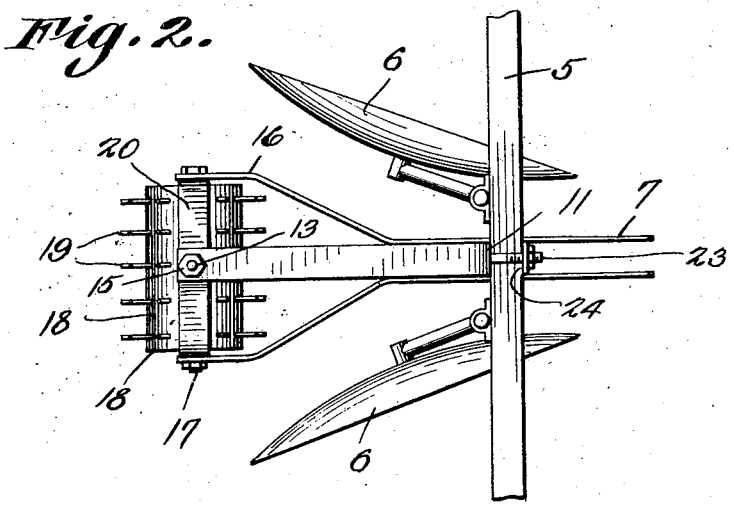
Figure 2 is a plan view of the device.

As shown by Figure 2, arms 7 have outwardly and rearwardly extended end portions 16 formed with openings to receive the shaft 17 on which the roller 18 operates, the roller being provided with a plurality of teeth 19 adapted to dig into the ground surface between the disks of the cultivator and which have been partially loosened by the cultivator disks.

The shaft 17 also passes through the downwardly extended portions of the frame 20 to which the rod 13 has connection, as at 21, with the result that the roller 18 will be held against lateral movement.

Openings 22 are formed in the bar 11 and are designed to receive the bolts 23 that pass through openings in the bar 24 to clamp the device to the beam 5 of the cultivator.

Since the bar 11 is rigidly secured to a cultivator beam, it will be seen that as the nut 15 is operated, the rod is elevated and the spring 13' placed under tension. When the proper tension has been placed on the spring, the bar 11 may be lowered or elevated to meet the requirement so that greater or less pressure is directed to the roller to adapt it for its particular work.

From the foregoing it will be seen that due to this construction, the efficiency of the usual cultivator employed in cultivating beets is greatly increased.

It might be further stated that this device may also be used in connection with disk harrows, or the like for conditioning the ground surface for planting.

I claim:

1. In a device of the character described, a frame, said frame including a vertical bar having a plurality of spaced openings, means extending through the openings for securing the bar to a cultivator frame, said bar including a rearwardly extended portion having an opening, a rod extending through the opening, a roller frame supported at the lower end of the rod, a spring surrounding the rod, and positioned between the rearwardly extended end of the bar and roller frame to exert a pressure on the roller frame, and a roller having teeth, operating in the roller frame.

2. In a device of the character described, a pair of spaced arms having a plurality of openings arranged therein and having diverging ends, a toothed roller supported between the diverging ends, a bar having its lower end adjustably supported between the spaced arms and adapted to hold the spaced arms in spaced relation with each other, said bar having a rearwardly extended end portion, said bar adapted to be secured to a cultivator frame, a frame adjacent to the roller, a rod extending upwardly from the frame and passing through the rearwardly extended end of the bar, and resilient means on the rod and engaging the rearwardly extended end of the bar for exerting a downward pressure on the frame and roller.

In testimony that I claim the foregoing as my own, I have hereto affixed my signature.

PETER NEU.